(No Model.)

D. M. McELHANEY.
COMBINED HARROW, CLOD CRUSHER, AND STALK CUTTER.

No. 311,842. Patented Feb. 3, 1885.

WITNESSES:

INVENTOR:
D. M. McElhaney

BY
ATTORNEYS.

UNITED STATES PATENT OFFICE.

DAVID MINIS McELHANEY, OF BUENA VISTA, OHIO.

COMBINED HARROW, CLOD-CRUSHER, AND STALK-CUTTER.

SPECIFICATION forming part of Letters Patent No. 311,842, dated February 3, 1885.

Application filed September 5, 1884. (No model.)

*To all whom it may concern:*

Be it known that I, DAVID MINIS McELHANEY, of Buena Vista, in the county of Scioto and State of Ohio, have invented certain new and useful Improvements in Combined Harrows, Clod-Crushers, and Stalk-Cutters, of which the following is a full, clear, and exact description.

Reference is to be had to the accompanying drawings, forming part of this specification, in which similar letters of reference indicate corresponding parts in both the figures.

Figure 1:
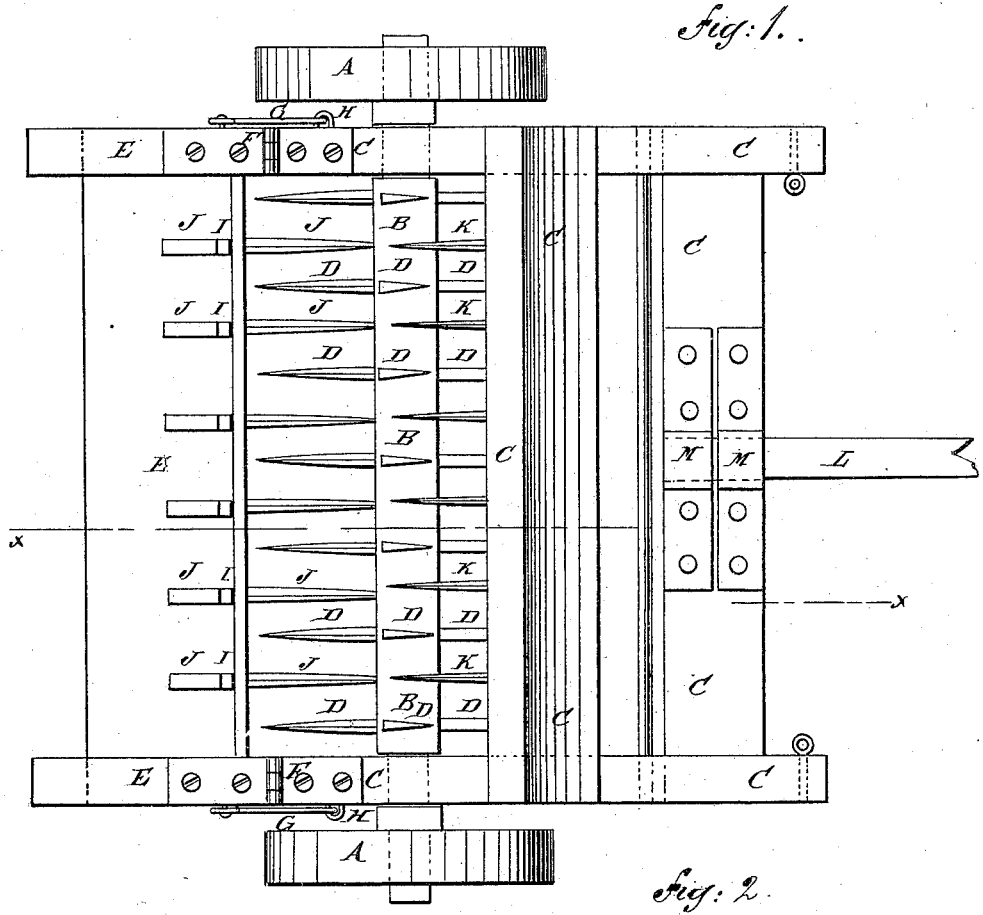
Figure 2:
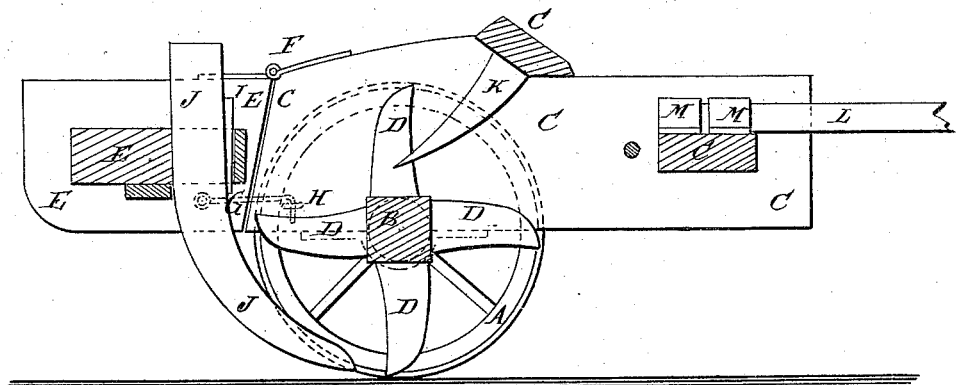

Figure 1 is a plan view of my improvement. Fig. 2 is a sectional side elevation of the same, taken through the broken line $x\,x$, Fig. 1.

The object of this invention is to facilitate the preparation of soil to receive seed and to promote thoroughness in such preparation.

The invention consists in a combined harrow, clod-crusher, and stalk-cutter constructed with wheels, and an axle provided with cutters, a stationary frame provided with cutters, and a hinged frame provided with curved harrow-teeth. The stationary and hinged frames are further connected by hooks, so that the harrow-teeth can be readily secured in working position, and can be raised from the ground for convenience in passing from place to place, as will be hereinafter fully described.

A represents the wheels, which are rigidly attached to the axle B, so as to carry the said axle with them in their revolution. The journals of the axle B revolve in bearings in the side bars of the frame C. The axle B is made square, and to it are attached four rows of cutters, D.

To the rear ends of the side bars of the frame C are connected the forward ends of the side bars of the frame E by hinges F, attached to the upper edges of the adjacent ends of the said side bars. The connection between the frames C E is made rigid, when desired, by hooks G, hinged to the side bars of the frame E, and hooking into staples H or eyebolts attached to the side bars of the frame C.

To the cross-bar of the frame E are secured, by wedge-keys I or other suitable means, the shanks of the harrow-teeth J, the lower parts of which are curved forward, and have their concaved edges made sharp. With this construction the teeth J can be adjusted to work at any desired depth in the soil. The top cross-bar of the frame C is placed a little in front of the axle B, and to it are attached cutters K, which are slightly curved to the rearward, so that their points will be over and at a little distance from the said axle B. The rear edges of the cutters K are made sharp. With this construction, when the machine is drawn forward, the harrow-teeth J stir up and loosen the soil and break in pieces loose clods and sods. Stalks and weeds, and such clods and sods as are not broken in pieces by the harrow-teeth J, will be carried by the revolving cutters D up the said teeth J and over the axle B till they strike the stationary cutters K, where they will be cut in pieces by and between the said cutters D K, the teeth J and the cutters K being so arranged that the cutters D will pass between the adjacent teeth and cutters, as indicated in Fig. 1.

The machine is guided and controlled by means of the tongue L, secured in sockets M, attached to the forward cross-bar of the frame C. With this construction, when the machine is to be drawn from place to place, the hooks G are unhooked and the frame E is turned up to rest upon the top cross-bar of the frame C.

Having thus described my invention, what I claim as new, and desire to secure by Letters Patent, is—

1. A combined harrow, clod-crusher, and stalk-cutter constructed substantially as herein shown and described, and consisting of the wheels and axle provided with cutters, the stationary frame provided with cutters, and the hinged frame provided with curved harrow-teeth, as set forth.

2. In a combined harrow, clod-crusher, and stalk-cutter, the combination, with the frames E C and the revolving axle B, of the stationary curved harrow-teeth J, the stationary cutters K, and the revolving cutters D, substantially as herein shown and described, whereby the soil will be pulverized, and clods, sods, stalks, and weeds will be crushed and cut in pieces, as set forth.

3. In a combined harrow, clod-crusher, and stalk-cutter, the combination, with the frame C, provided with cutters K, and the frame E, provided with curved harrow-teeth J, of the hinges F and the hooks G, substantially as herein shown and described, whereby the said harrow-teeth can be readily secured in working position, and can be raised from the ground for convenience in passing from place to place, as set forth.

DAVID MINIS McELHANEY.

Witnesses:
SUSAN M. DEVOSS,
NIC KLEIN.